US008897502B2

(12) United States Patent
Lu

(10) Patent No.: US 8,897,502 B2
(45) Date of Patent: Nov. 25, 2014

(54) CALIBRATION FOR STEREOSCOPIC CAPTURE SYSTEM

(75) Inventor: Cheng Lu, San Jose, CA (US)

(73) Assignee: Aptina Imaging Corporation, George Town (KY)

( * ) Notice: Subject to any disclaimer, the term of this patent is extended or adjusted under 35 U.S.C. 154(b) by 532 days.

(21) Appl. No.: 13/217,619

(22) Filed: Aug. 25, 2011

(65) Prior Publication Data

US 2012/0275667 A1  Nov. 1, 2012

Related U.S. Application Data

(60) Provisional application No. 61/480,571, filed on Apr. 29, 2011.

(51) Int. Cl.
*G06K 9/36* (2006.01)
*G06T 17/00* (2006.01)
*G06T 7/00* (2006.01)
*H04N 13/02* (2006.01)
*G06K 9/00* (2006.01)

(52) U.S. Cl.
CPC .. *H04N 13/0239* (2013.01); *G06T 2207/10012* (2013.01); *G06K 9/00281* (2013.01); *G06T 7/002* (2013.01); *G06T 2207/30201* (2013.01)
USPC .......................................... 382/118; 382/154

(58) Field of Classification Search
None
See application file for complete search history.

(56) References Cited

U.S. PATENT DOCUMENTS

2008/0310757 A1* 12/2008 Wolberg et al. ............... 382/285
2011/0187829 A1*  8/2011 Nakajima ....................... 348/46
2012/0105599 A1*  5/2012 Lin et al. ......................... 348/50
2012/0310098 A1* 12/2012 Popovic ........................ 600/476

OTHER PUBLICATIONS

Zilly et al., "Joint Estimation of Epipolar Geometry and Rectification Parameters using Point Correspondences for Stereoscopic TV Sequences", Fraunhofer Institute for Telecommunications, Proceedings of 3DPVT, informatik.hu-berlin.de, 2010.
Richard I. Hartley, "Theory and Practice of Projective Rectification",International Journal of Computer Vision, vol. 35, No. 2, 1998, pp. 1-18.
Fusiello et al., "Quasi-Euclidean Uncalibrated Epipolar Rectification", Pattern Recognitiion, 2008.
Ran et al., "Stereo Cameras Self-calibration Based on SIFT", 2009 International Conference on Measuring Technology and Mechatronics Automation, IEEE Computer Society, 2009, pp. 352-355.
Richard I. Hartley, In Defence of the 8-point Algorithm, IEEE Transactions on Pattern Analysis and Machine Intelligence, 19(6): 580-593, 1997.
Feris et al., "Facial Feature Detection Using a Hierarchical Wavelet Face Database", Technical Report, MSR-TR-2002-05, Jan. 9, 2002.

* cited by examiner

*Primary Examiner* — Brian P Werner
(74) *Attorney, Agent, or Firm* — Michael H. Lyons

(57) ABSTRACT

Apparatus and a method for generating a rectified image. First pixel information corresponding to a first image is received from a first imager. Second pixel information corresponding to a second image is received from a second imager. A plurality of facial feature points of a portrait in each of the first and second images are identified. A fundamental matrix is generated based on the detected facial features. An essential matrix is generated based on the fundamental matrix. Rotational and translational information corresponding to the first and second imagers are generated based on the essential matrix. The rotational and translational information are applied to at least one of the first and second images to generate at least one rectified image.

15 Claims, 5 Drawing Sheets

CALIBRATION FOR STEREOSCOPIC CAPTURE SYSTEM

CROSS REFERENCE TO RELATED APPLICATIONS

This application claims priority of U.S. Provisional Patent Application Ser. No. 61/480,571, filed Apr. 29, 2011, which is incorporated herein by reference.

FIELD

The subject invention concerns an imaging system and in particular to applying calibration to a stereo imaging system.

BACKGROUND

A stereoscopic image creates the illusion that the picture viewed is three-dimensional. One way to create depth perception in the brain is to provide the eyes of the viewer with two different images, representing two perspectives of the same object, with a minor deviation similar to the perspectives that both eyes naturally receive in binocular vision. A stereoscopic image may be generated using images from a stereo camera, which is a type of camera with two or more lenses with a separate image sensor for each lens. The distance between the lenses in a typical stereo camera is about the distance between one's eyes. This allows the camera to simulate human binocular vision, and therefore gives it the ability to capture three-dimensional images. When the two images of a stereo pair are viewed separately by the left and right eyes, they blend together in the perception of the viewer to form a single visual image.

BRIEF DESCRIPTION OF THE DRAWINGS

For a more complete understanding of the nature and benefits of the invention, reference should be made to the following detailed description taken in conjunction with the accompanying drawings, in which.

DETAILED DESCRIPTION

Figure 1:
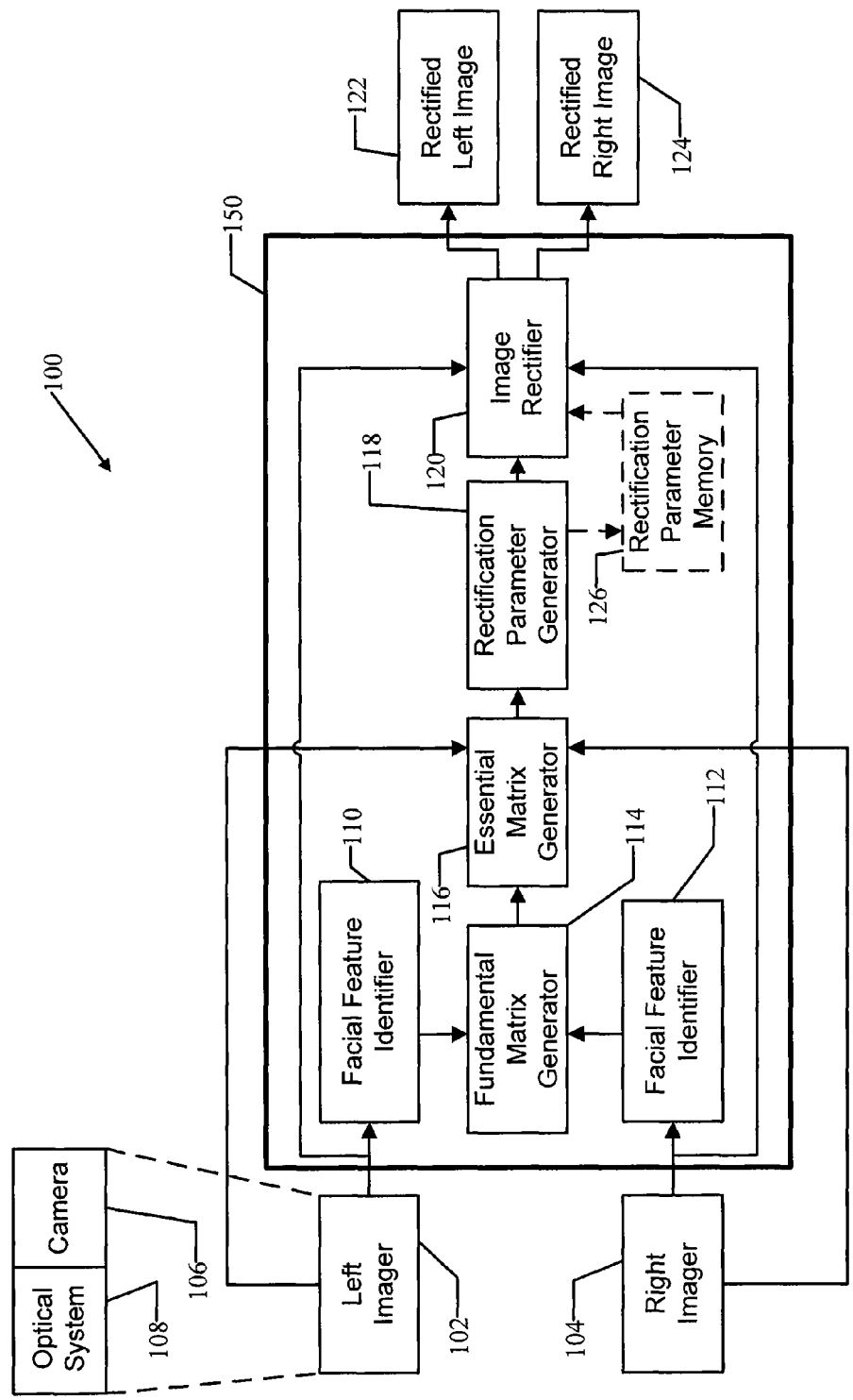
FIG. 1 is a block diagram of a system according to an example embodiment of the invention.

A stereo camera is a type of camera with two or more lenses with a separate image sensor for each lens. This allows the camera to simulate human binocular vision and may be used to capture content for three-dimensional images or videos. Misalignment of the cameras may lead to disparities such as vertical or rotational disparities between images generated by one camera and images generated by another camera of the stereo camera pair.

Disparities in stereo pairs may lead to eye strain and visual fatigue. Thus, a rectification procedure may minimize the possible vertical disparity impact. Accurate rectification may be performed using parameters of the cameras referred to as "extrinsic parameters." The extrinsic parameters represent the position and orientation of the cameras so that these parameters relate the cameras to the outside world. This is in contrast to "intrinsic" parameters such as focal length, pixel ratio, and optical centers, which depend on the cameras themselves and not on their environment. The extrinsic parameters may include the positions and orientations of the cameras since these parameters reflect the misalignment of an imperfect stereo camera configuration. The systems and methods described below may calibrate the extrinsic parameters of stereo cameras and rectify images generated by misaligned cameras of a stereo camera pair.

One method of calibrating cameras includes taking multiple pictures of a checkerboard with blocks having a known size under various angles. The intrinsic and extrinsic parameters may then be calculated off-line. This method requires a special calibration object (e.g., a checkerboard), is computation intensive, and the parameters must be re-generated after a change in the camera parameters, such as zoom.

Under another calibration technique, referred to as self-calibration, the optimization parameters are extracted using corresponding points of stereo image pairs of a real scene. Self-calibration improves flexibility by overcoming the need for a special calibration object. This method, however, relies on the corresponding feature points in the image pairs of real scene. As a result, accuracy and robustness may be low because an uncertain number of features may be detected and correspondences between the features from image pairs may be mismatched.

A method according to an example embodiment of the invention is described below for calibrating a stereo camera using a portrait image pair. This method avoids the need for a special calibration object and may reduce the difficulty in finding corresponding feature points in image pairs. The portrait image pair may be provided by taking a self-portrait such that the face fits within the image, such as by users stretching their arms straight forward so that their whole faces fall inside the image, or by photographing another person.

Facial feature points may be more precisely detected, localized, and matched between stereo image pairs on a portrait picture than other features in an image. The facial feature points may then be used as further described below to calibrate the cameras and rectify images generated by a stereo camera pair. In addition, the human eye and brain are more sensitive to errors in facial features than to other objects.

A photograph of a portrait is taken with the stereo camera pair, resulting in a portrait image corresponding to each camera. The facial feature points of the portrait are identified for each image of the stereo pair. The correspondence between several feature points in each of the images is then identified. For example, the left nostril may be identified in the portrait of the left image and the left nostril may be identified in the portrait of the right image. The correspondences between the facial feature points in the two images of the stereo pair is then used to calibrate the stereo camera pair using epipolar geometry theory.

There is shown in FIG. 1 an example imaging device 100 according to an example embodiment of the invention. The imaging device includes an image processor 150, a first imager 102, and a second imager 104. The first and second imagers 102, 104 are hereinafter referred to as the left imager 102 and the right imager 104.

The left and right imagers 102, 104 may include, for example, an optical system 108 and a camera 106, for generating the pixel information corresponding to the images as illustrated in FIG. 1 for the left imager 102. The right imager 104 may similarly include an optical system and camera or other apparatus (not shown) for generating an image.

Figure 2:
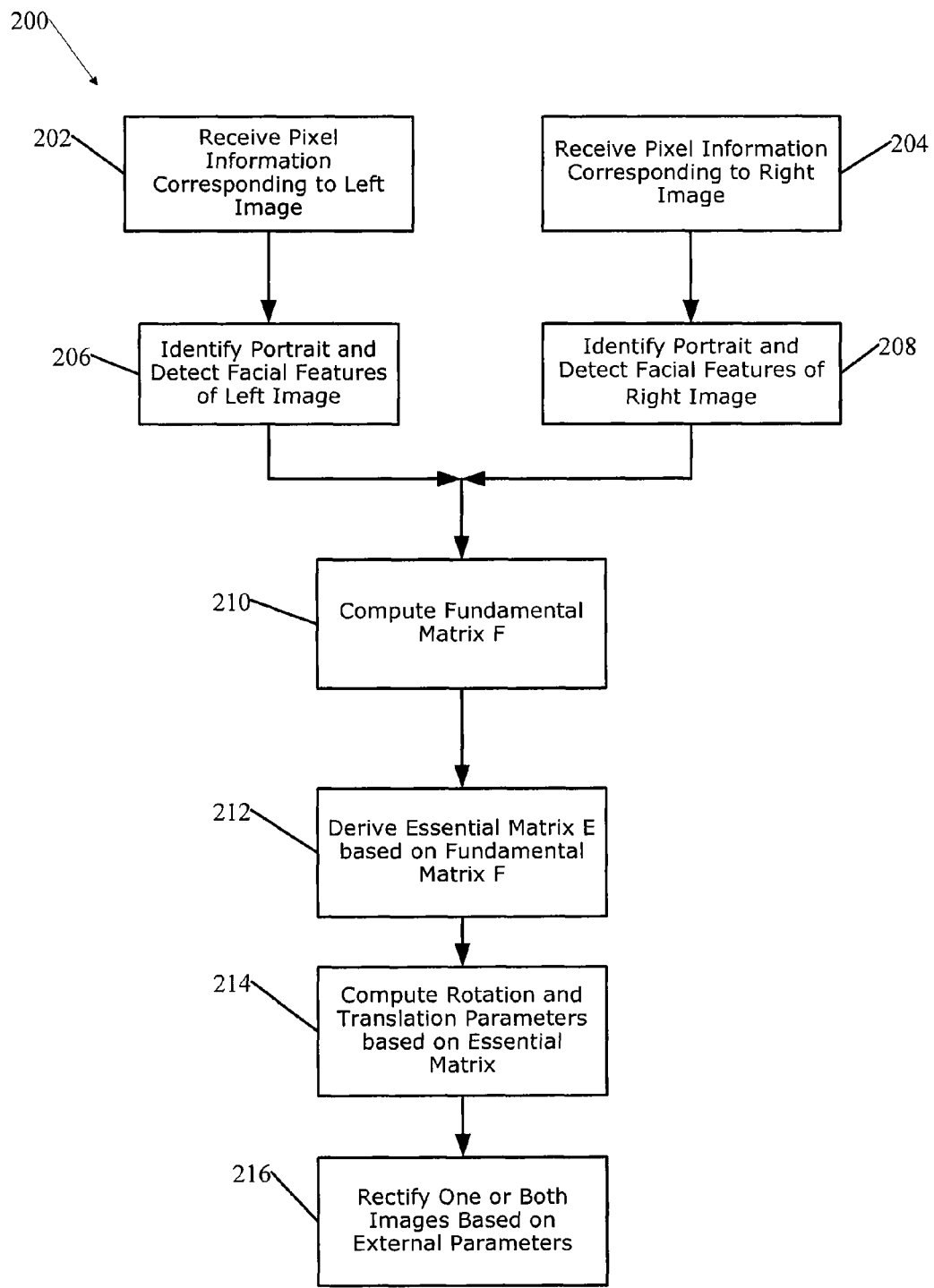
FIG. 2 is a flow chart of a method according to an example embodiment of the invention.

Operation of the image processor 150 according to an example embodiment of the invention is described below with reference to the flow chart 200 shown in FIG. 2. In step 202, a first facial feature identifier module 110 of the image processor 150 receives first pixel information corresponding to a first image from the left imager 102. In step 204, a second facial feature identifier module 112 of the image processor 150 receives second pixel information corresponding to a second image from the right imager 102.

In step 206, the first facial feature identifier module 110 identifies a plurality of facial feature points of a portrait in the first image based on the first pixel information. Similarly, in step 208, the second facial feature identifier module 112 identifies a plurality of facial feature points of a portrait in the second image based on the second pixel information. Although steps 202, 206 are shown in the flow chart 200 as being in parallel with steps 204, 208, embodiments of the invention encompass having a single facial feature identifier module that serially performs steps 202 through 208.

The portrait and facial features may be identified using traditional facial feature recognition techniques. In an example embodiment, the WaveBase facial feature detection system may be used to detect the facial features as described in Feris et al., *Facial Feature Detection Using a Hierarchical Wavelet Face Database*, Microsoft Research Technical Report MSR-TR-2002-05, Jan. 9, 2002. In an example embodiment, eight facial features and their correspondence between the left image portrait and right image portrait are determined. The detected facial features may include the following: left eye outside corner, left eye inside corner, right eye inside corner, right eye outside corner, left nostril, right nostril, left lip corner and right lip corner. Other facial feature points can also be used by the calibration.

In an example embodiment, the facial features are automatically identified. In another example embodiment, which may enhance feature detection accuracy, one or more of the facial features are identified with user assistance. For example, a user may use a pointer device such as a mouse, or use a touch screen, to point to the location of facial features such as eyes, nose, and mouth to be input to the facial feature detection procedure to enhance the identification of precise facial feature locations.

Once the facial feature points are detected, the correspondence to facial feature points between images of the image pair is determined. The facial feature points are received and used in step 210 by the fundamental matrix generator 114 to generate a fundamental matrix corresponding to the first and second images. The fundamental matrix has rank 2 and 7 degrees of freedom, and hence, may be generated in an example embodiment from only seven correspondences between the left and right images.

Epipolar geometry is the intrinsic projective geometry between two views. When two cameras view a three-dimensional scene from two distinct positions, there are a number of geometric relations between the three-dimensional points and their projections onto the two-dimensional images that lead to constraints between the image points. These constraints are described by the epipolar constraints. According to the epipolar constraints, an essential matrix may be defined to describe the transformation from the coordinates system of one imager into the coordinate system of the other imager.

An essential matrix is generated by the essential matrix generator 116 in step 212 based on the fundamental matrix received from the fundamental matrix generator 114. The essential matrix may be defined as $E=[t]_x R$, where $[t]_x$ is the cross product matrix of the vector t where R and t denote the rotational and translational portions, respectively, of the coordinate transformation from the first into the second camera coordinate system. The essential matrix generator 116 may use intrinsic information corresponding to and received from the left and right imagers 102, 104 to generate the extrinsic matrix. In an example embodiment, the essential matrix is generated based on the following equation:

$$F = A_1^{-T} E A_2^{-1} \quad [1]$$

In equation [1] above, F is the fundamental matrix, E is the essential matrix and $A_1$ and $A_2$ are matrices encoding intrinsic parameters corresponding to the left and right imagers 102, 104, respectively.

In an example embodiment, the intrinsic parameters corresponding to the left and right images used for generating the essential matrix are received by the essential matrix generator 116 from the left and right imagers 102, 104, respectively. For example, the focal length and optical center corresponding to each of the left and right images may be provided by the imagers 102, 104 to the essential matrix generator 116 for generating the essential matrix. For example, the intrinsic parameters may be communicated in the form of meta data attached with the pixel information corresponding to the captured images. In another example embodiment, the intrinsic parameters may be based on the manufactured configuration of the imager.

The essential matrix is used in step 214 by the rectification parameter generator 118 to generate rectification parameters corresponding to the left and right imagers 102, 104. In an example embodiment, the rectification parameters are rotational and translational parameters corresponding to the first and second images generated by the first and second imagers 102, 104, respectively.

Given the essential matrix E, the extrinsic parameters rotation "R" and translation "t," which represent the positions and translations of stereo cameras, may be determined. The rectification parameters are used in step 216 by the image rectifier 120 to rectify one or both of the left and right images. In an example embodiment, the pixel information corresponding to one of the left and right images is adjusted to rotate and/or translate one image to match the position of the other corresponding image. In other words, one image is rectified so that the positions of its facial feature points match the positions of the facial feature points of the other image. In another example embodiment, both the left and right image information are rectified to rotate and/or translate the images to an intermediate position between the positions of the original left and right images.

In a stereo image pair, there may be a desired offset between an image generated by the left camera and an image generated by the right camera. This offset may provide different perspectives to the viewer to create depth perception. In an example embodiment, the left and/or right images are not rectified to result in 100% overlap between the images. An intended horizontal translation between the images may be retained to provide depth perception.

In an example embodiment, the image processor 150 includes an optional rectification parameter memory 126 shown in phantom in FIG. 1. The rectification parameter generator 118 generates rectification parameters corresponding to the left and right imagers 102, 104. The rectification parameters (e.g., rotational and translational parameters) corresponding to the first and second images generated by the first and second imagers 102, 104, respectively, are stored in the memory 126 and indexed based on their respective intrinsic parameters.

When the zoom of an imager 102, 104 is changed, the focal length, and therefore the intrinsic parameters, will change. The changed intrinsic parameters will result in a change in the corresponding fundamental matrix and therefore a change in the rectification parameters. Thus, in an example embodiment, each time the intrinsic parameters change, the method above is repeated to calculate new rectification parameters.

In an example embodiment, the rectification parameters are stored in the memory 126 and indexed based on the corresponding intrinsic parameters corresponding to the left and right images. For example, for each of a plurality of combinations of focal length and image center, the rectification parameters may be stored in memory 126.

Figure 3:
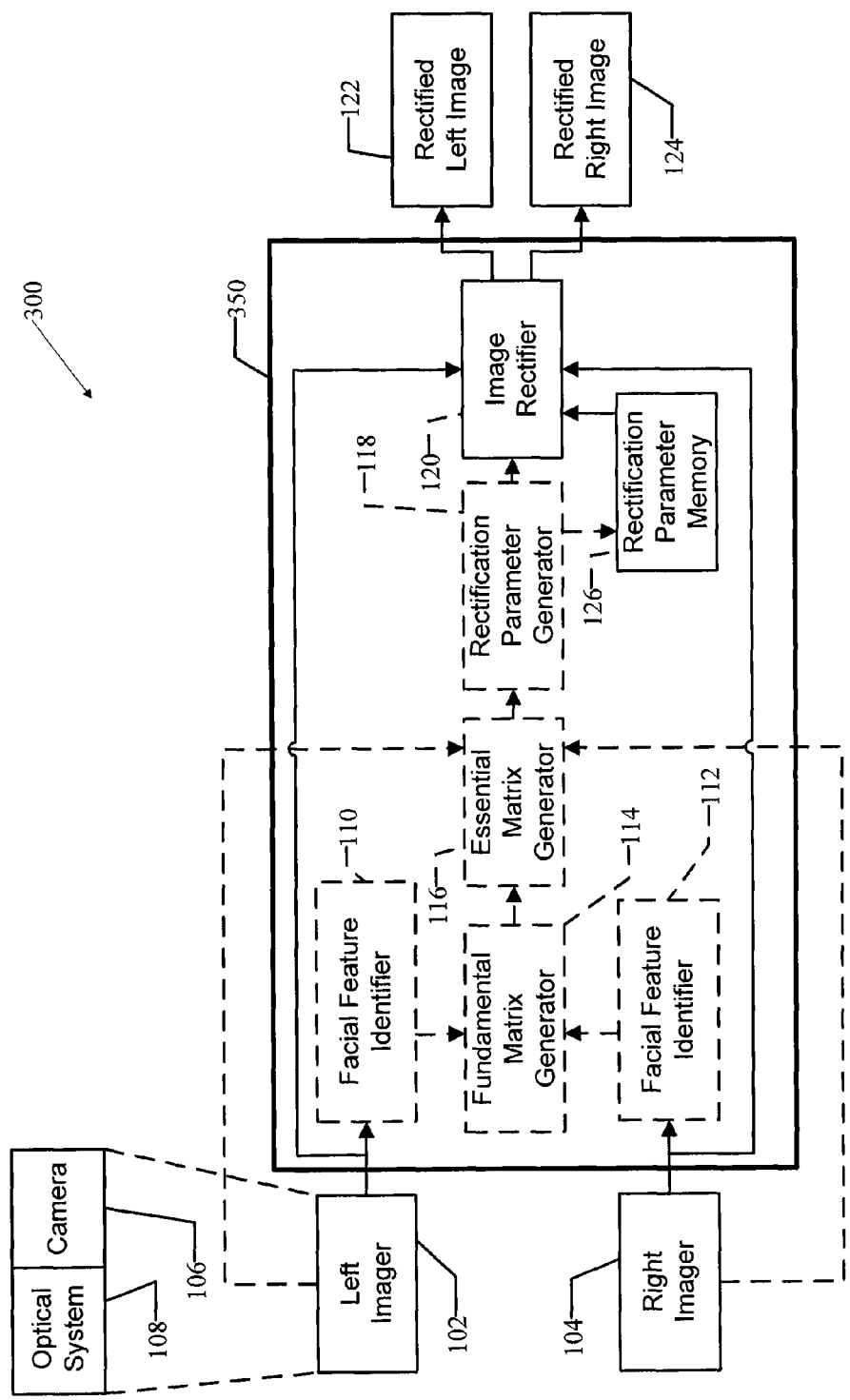
FIG. 3 is a block diagram of a system according to an example embodiment of the invention.

In an example embodiment, when the rectification parameters for a corresponding intrinsic parameters are already stored in memory 126, rather than recalculate the rectification parameters, the image rectifier 120 generates rectified images 122, 124 based on rectification parameters stored in the rectification parameter memory 126. This mode of operation is illustrated by the block diagram of the imaging device 300 shown in FIG. 3. In this mode of operation when the rectification parameters corresponding to certain intrinsic parameters are already stored in the rectification parameter memory 126, the modules of the imaging device 300 that are not operational are shown in phantom.

The image rectifier 120 receives the pixel information and intrinsic parameters corresponding to the first and second images from the left and right imagers 102, 104. The image rectifier 120 receives the corresponding rectification parameters from the rectification parameter memory 126. The image rectifier 120 generates the rectified images 122, 124 based on the pixel information corresponding to the first and second images and the corresponding rectification parameters read from the rectification parameter memory 126.

In an example embodiment, the images generated by the imagers 102, 104 are processed in real time by the image processor 150 to generate the rectified images 122, 124. The rectified images may then be stored in a memory (not shown). In another example embodiment, the images generated by the imagers 102, 104 are stored in a memory (not shown) and the stored images are later processed off-line to generate the rectified images.

Figure 4:
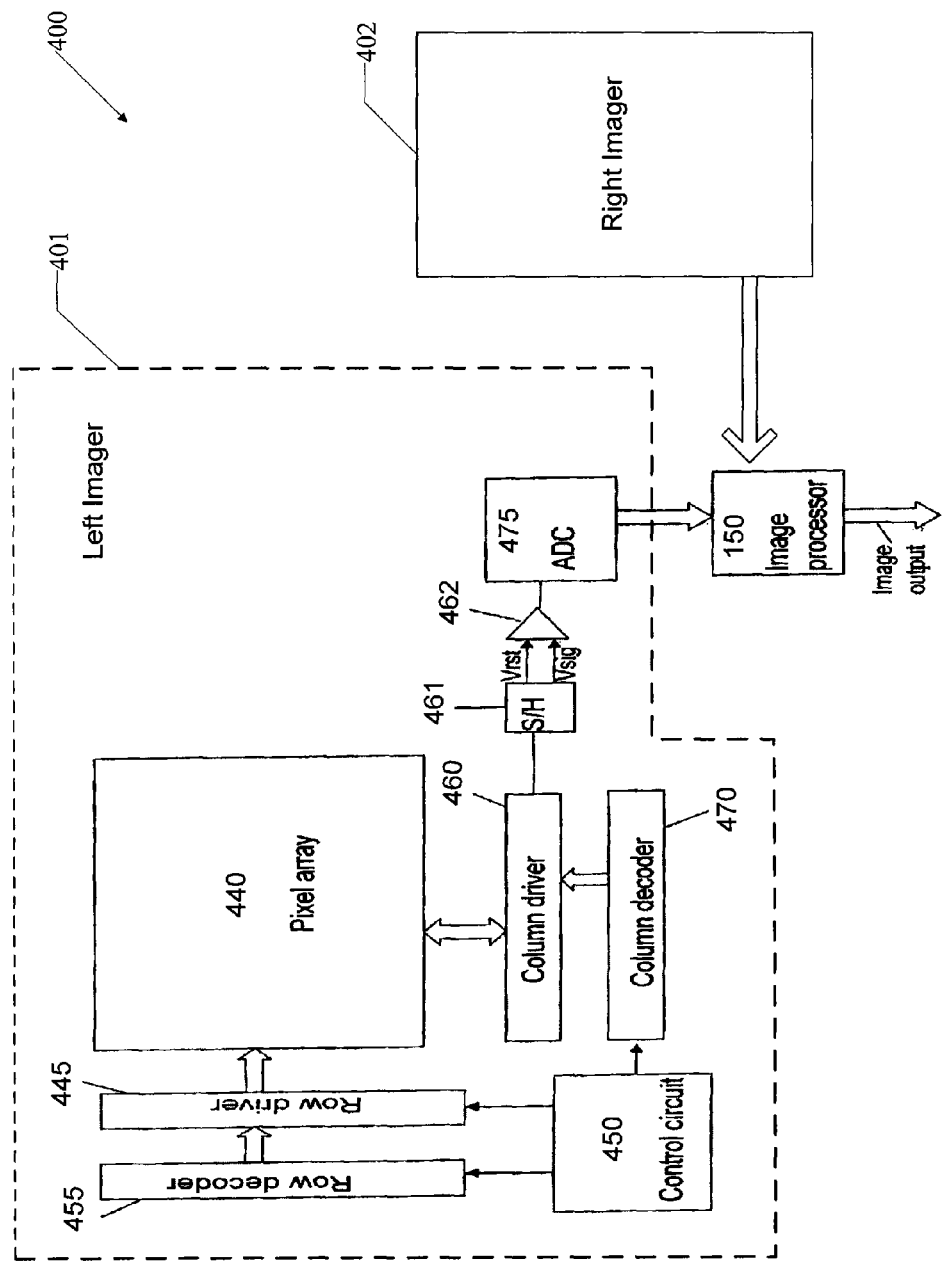
FIG. 4 shows a block diagram of an imaging system in accordance with an example embodiment of the invention.

FIG. 4 illustrates an exemplary imaging device 400 that may use an image processor 150 according to an embodiment of the invention. The imaging device 400 includes a left imager 401 and a right imager 402. The left imager 401 includes a pixel array 440. Row lines of the array 440 are selectively activated by a row driver 445 in response to row address decoder 455. A column driver 460 and column address decoder 470 are also included in the imaging device 400. The imaging device 400 is operated by the timing and control circuit 450, which controls the address decoders 455, 470. The control circuit 450 also controls the row and column driver circuitry 445, 460.

A sample and hold circuit 461 associated with the column driver 460 reads a pixel reset signal Vrst and a pixel image signal Vsig for selected pixels of the array 440. A differential signal (Vsig−Vrst) is produced by differential amplifier 462 for each pixel and is digitized by analog-to-digital converter 475 (ADC). The analog-to-digital converter 475 supplies the digitized pixel signals to an image processor 150 according to an example embodiment of the invention which forms and may output a rectified digital image. The right image generator 402 may be identical to the left image generator 401. The image processor 150 may have a circuit that is capable of performing the methods described above for generating one or more rectified images. In an example embodiment the left and right imagers 401, 402 store intrinsic parameters which may be read by the image processor 150. In another example embodiment, the image processor 150 controls the optics of the left and right imagers 401, 402 to control the intrinsic parameters such as focus and zoom.

Figure 5:
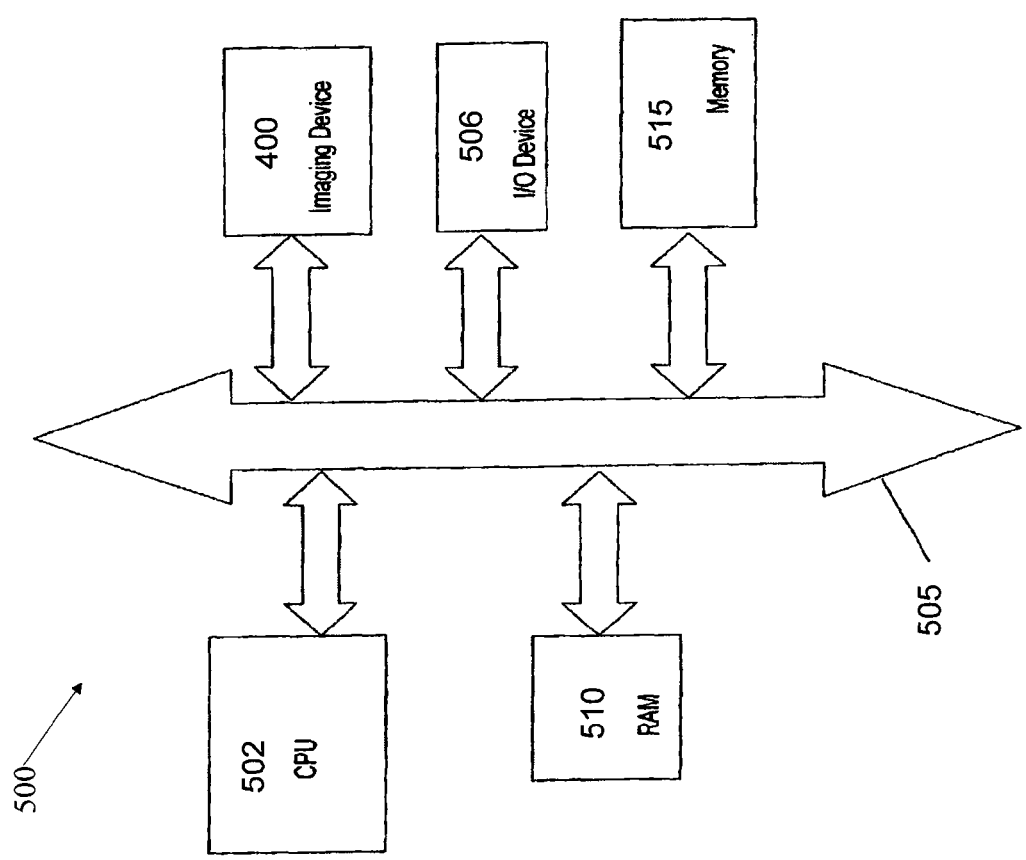
FIG. 5 shows a processor system incorporating at least one imaging system constructed in accordance with an example embodiment of the invention.

FIG. 5 shows system 500, a typical processor system modified to include the imaging device 400 (FIG. 4) of an example embodiment of the invention. The system 500 is exemplary of a system having digital circuits that could include image sensor devices. Without being limiting, such a system could include a computer system, still or video camera system, scanner, machine vision, video phone, and auto focus system, or other imager applications.

System 500, for example a camera system, generally comprises a central processing unit (CPU) 502, such as a microprocessor, that communicates with an input/output (I/O) device 506 over a bus 504. Imaging device 400 also communicates with the CPU 502 over the bus 504. The processor-based system 500 also includes random access memory (RAM) 510, and can include non-volatile memory 515, which also communicate with the CPU 502 over the bus 504. The imaging device 400 may be combined with a processor, such as a CPU, digital signal processor, or microprocessor, with or without memory storage on a single integrated circuit or on a different chip than the processor.

In one aspect, the invention comprises a method for processing image information received from a first imager and from a second imager. First pixel information corresponding to a first image is received from the first imager. Second pixel information corresponding to a second image is received from the second imager. A plurality of facial feature points of a portrait in each of the first and second images are identified. A fundamental matrix is generated based on the identified facial feature points. An essential matrix is generated based on the fundamental matrix. Rotational and translational information corresponding to the first and second imagers is computed based on the essential matrix.

In another aspect, the invention comprises an image processor. The system includes a facial feature identifier that receives first pixel information corresponding to a first image and second pixel information corresponding to a second image, and identifies a plurality of facial feature points of a portrait in each of the first and second images. A fundamental matrix generator generates a fundamental matrix based on the identified facial feature points in the first and second images. An essential matrix generator generates an essential matrix based on the fundamental matrix and based on intrinsic parameters corresponding to the first and second pixel information. A rectification parameter generator generates rotational and translational information corresponding to the first and second images based on the essential matrix. An image rectifier receives the first and second pixel information and generates at least one rectified image based on the rotational and translational information corresponding to the first and second images.

In yet another aspect, the invention comprises a method for processing image information in a system having a rectification parameter memory. The rectification parameter memory stores a plurality of rectification parameters. The rectification parameters are indexed according to corresponding intrinsic parameters of a first and second imager. First pixel information corresponding to a first image is received from the first imager. Second pixel information corresponding to a second image is received from the second imager. Intrinsic parameters corresponding to the first and second images are identified and the rectification parameters corresponding to the identified intrinsic parameters are read from the memory.

Those rectification parameters are then applied to at least one of the first and second pixel information to generate at least one rectified image.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for using an imaging device having a first imager, a second imager that is different from the first imager, and image processing circuitry for processing image information received from the first and second imagers, the method comprising:
   with the image processing circuitry, receiving first pixel information corresponding to a first image captured by the first imager;
   with the image processing circuitry, receiving second pixel information corresponding to a second image captured by the second imager;
   with the image processing circuitry, identifying a plurality of facial feature points of a portrait in each of the first and second images; and
   with the image processing circuitry, computing rotational and translational information corresponding to the first and second imagers based on the identified facial feature points in each of the first and second images.

2. The method according to claim 1, further comprising:
   with the image processing circuitry, identifying eight facial feature points of the portrait in each of the first and second images.

3. The method according to claim 1, further comprising:
   with the image processing circuitry, receiving user input for identifying one or more of the plurality of facial feature points.

4. The method according to claim 1, further comprising:
   with the image processing circuitry, automatically identifying the plurality of facial feature points.

5. The method according to claim 1, further comprising:
   with the image processing circuitry, generating an essential matrix based on the following equation:

$$F = A_1^{-T} E A_2^{-1}$$

where F is a fundamental matrix based on the identified facial feature points, E is the essential matrix and A1 and A2 are matrices encoding intrinsic parameters corresponding to the first and second imagers, respectively, wherein the rotational and translational information are computed based on the essential matrix.

6. The method according to claim 5, further comprising:
   with the image processing circuitry, receiving intrinsic parameters corresponding to the first and second images from the first and second imagers, respectively, for generating the essential matrix.

7. The method according to claim 1, further comprising:
   with the image processing circuitry, receiving intrinsic parameters corresponding to the first and second images and storing the rotational and translational information in a memory indexed based on the intrinsic parameters.

8. The method according to claim 1, further comprising:
   with the image processing circuitry, applying the rotational and translational information to at least one of the first and second images to generate at least one rectified image.

9. An imaging device comprising:
   a first image sensor configured to capture a first image;
   a second image sensor that is different from the first image sensor and that is configured to capture a second image; and
   an image processor, wherein the image processor comprises:
   a facial feature identifier configured to receive first pixel information from the first image sensor corresponding to the first image and second pixel information from the second image sensor corresponding to the second image, wherein the facial feature identifier is configured to identify a plurality of facial feature points of a portrait in each of the first and second images;
   a fundamental matrix generator configured to generate a fundamental matrix based on the identified facial feature points in the first and second images;
   an essential matrix generator configured to generate an essential matrix based on the fundamental matrix and based on intrinsic parameters corresponding to the first and second pixel information;
   a rectification parameter generator configured to generate rotational and translational information corresponding to the first and second images based on the essential matrix; and
   an image rectifier configured to receive the first and second pixel information and configured to generate at least one rectified image based on the rotational and translational information corresponding to the first and second images.

10. The image processor of claim 9 comprising a rectification parameter memory for storing the rotational and translational information corresponding to the first and second images based indexed according to intrinsic parameters corresponding to the first and second images.

11. The method defined in claim 7, further comprising:
    with the image processing circuitry, receiving a third image captured by the first imager;
    with the image processing circuitry, receiving a fourth image captured by the second imager;
    with the image processing circuitry, generating a first rectified image by applying the stored rotational and translation information in the memory to the third image; and
    with the image processing circuitry, generating a second rectified image by applying the stored rotational and translational information in the memory to the fourth image.

12. The method defined in claim 11, further comprising:
    with the image processing circuitry, receiving a first set of intrinsic parameters from the first imager corresponding to the third image captured by the first imager;
    with the image processing circuitry, receiving a second set of intrinsic parameters from the second imager corresponding to the fourth image captured by the second imager;
    with the image processing circuitry, generating the first rectified image by applying a first set of rotational and translational information in the memory that corresponds to the first set of intrinsic parameters to the third image; and
    with the image processing circuitry, generating a second rectified image by applying a second set of rotational and translational information in the memory that corresponds to the second set of intrinsic parameters to the fourth image.

13. The method defined in claim 12, wherein the image processing circuitry receives the first set of intrinsic parameters in image meta data associated with the third image.

14. The method defined in claim 11, wherein the image processing circuitry generates the first and second rectified images in real time.

15. The imaging device defined in claim 9, further comprising:
- a first lens formed over the first image sensor; and
- a second lens formed over the second image sensor.

* * * * *